UNITED STATES PATENT OFFICE.

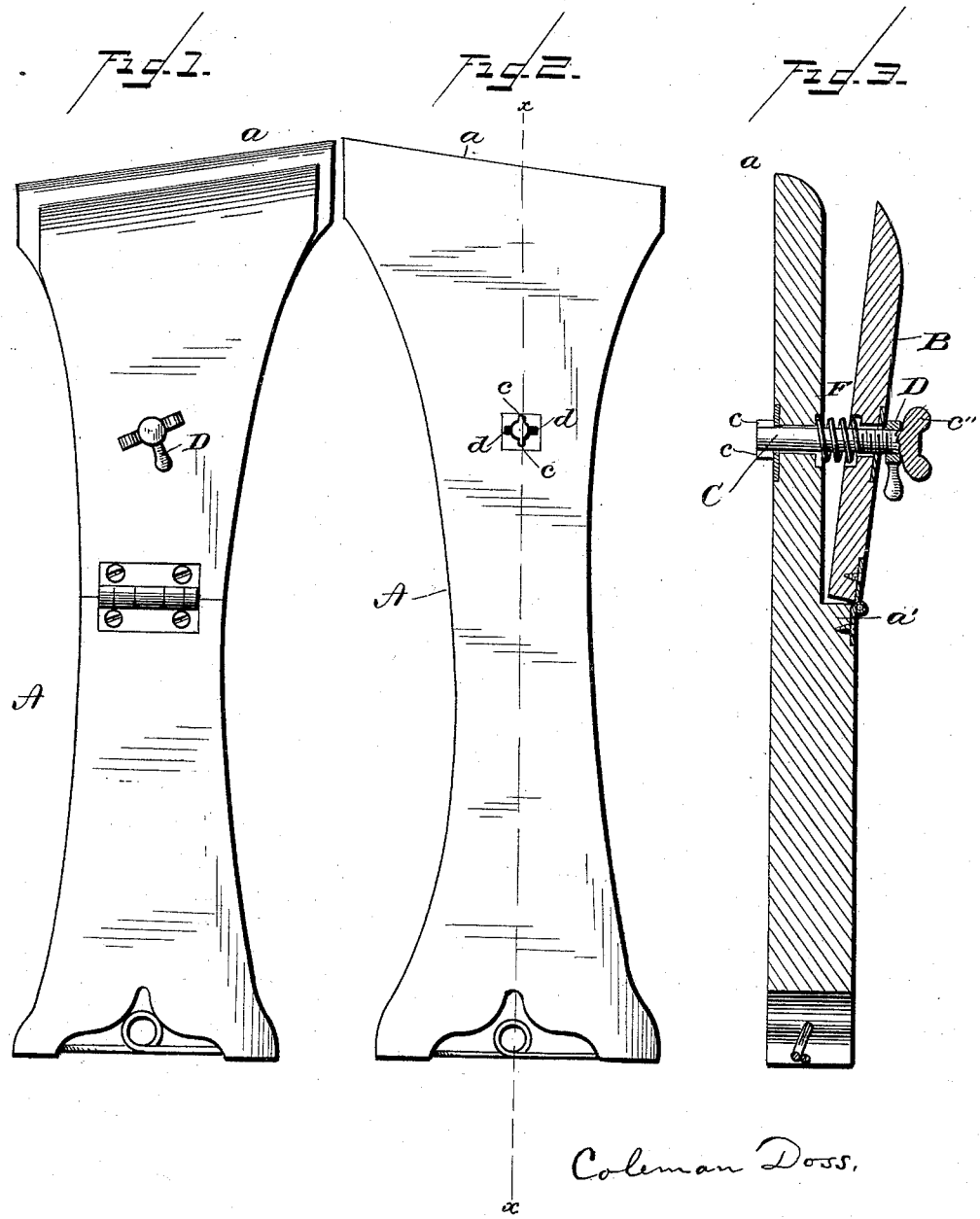

COLEMAN DOSS, OF LADDONIA, MISSOURI.

STITCHING-CLAMP.

SPECIFICATION forming part of Letters Patent No. 405,349, dated June 18, 1889.

Application filed March 9, 1889. Serial No. 302,628. (No model.)

*To all whom it may concern:*

Be it known that I, COLEMAN DOSS, a citizen of the United States, residing at Laddonia, in the county of Audrain and State of Missouri, have invented certain new and useful Improvements in Clamping Devices; and I do hereby declare the following to be a full, clear, and exact description of the invention, such as will enable others skilled in the art to which it appertains to make and use the same.

My invention relates to improvements in "whipping-clamps," and has for its object the production of a tool for the use and convenience of shoe-makers and all workers in leather, which makes it possible to dispense with the use of paste as a means of holding the parts together ready for stitching.

My invention is described as follows, and illustrated in the accompanying drawings, which are to be considered a part of this application.

Similar letters of reference refer to corresponding parts in all the views.

Figures 1 and 2 are views of opposite sides of my invention. Fig. 3 is a sectional view showing the lips open.

A represents the body of my invention, having at its upper end a broadened portion which forms one of the lips of the clamp. Such lip is designated $a$. The lower part of body A is nearly twice as thick as the upper part from the shoulder $a'$ upward, such reduction of thickness being for the purpose of providing a place for sub-lip B, which is joined to the body A by a hinge at $a'$. Sub-lip B is somewhat shorter than lip $a$, and when the lips are closed they are so rounded as to resemble the quadrant of a circle, and as lip $a$ projects above lip B it serves as a convenient rest for laying the leather when it is desired to sew only partly through the same.

The lips are opened and closed by means of bolt C, having at its head two lateral projections $c\ c$, the purpose of which will be hereinafter described. The other end of bolt C is provided with a flattened portion or thumb-piece, while the intermediate part of such bolt, between the thumb-piece and the head, (except that part passing through the lip $a$,) is provided with a screw-thread, upon which works nut D, such nut being provided with an arm for convenience. The flattened portion or thumb-piece on bolt C, above described, is indicated in the drawings as $c''$.

The hole in lip B may be provided with a metal collar to prevent nut D from wearing the wood. In like manner a metal collar is placed in the hole in lip $a$, such collar to be provided with two slots or grooves $d\ d$ opposite each other.

The diameter of the hole and the bolt are to be coincident; but the lateral projections $c\ c$ are to extend past the diameter of such hole, and it will thus be seen that such projections $c\ c$ form the head of the bolt.

The lips of the clamp may be tightly closed by means of nut D being screwed upon bolt C, or they may be opened by reversing the action of such nut, when the spiral spring F around the bolt will push against lip B and force it outward.

When it is desired to more quickly release the material in the clamp, bolt C may be turned by means of thumb-piece $c''$ until the lateral projections $c\ c$ coincide with slots $d\ d$, when the bolt may be withdrawn from the hole in lip $a$ and the lips opened.

Having thus described my invention, what I claim as new, and desire to secure by Letters Patent, is—

In a clamping device, two jaws, one shorter than the other and shaped at their upper ends substantially as described, the shorter one hinged to the longer one, in combination with the screw-threaded bolt C, fitted in holes formed in said jaws and having on its head the lateral arms $c\ c$, adapted to coincide with slots $d\ d$, and having thumb-piece $c''$, and nut D, having internal screw-thread located on bolt C between the jaws B and thumb-piece $c''$ and adapted to turn on said bolt to close the jaws, and spring F between the jaws, all as described, and for the purpose named.

In testimony whereof I affix my signature in presence of two witnesses.

COLEMAN DOSS.

Witnesses:
J. L. RUNNELLS,
J. C. DE LAPORTE.